United States Patent
Bartzke et al.

(10) Patent No.: US 6,919,666 B2
(45) Date of Patent: Jul. 19, 2005

(54) ADJUSTING DEVICE FOR DISPLACING INDIVIDUAL ELEMENTS OF OPTICAL SYSTEMS OR OF MEASURING SYSTEMS

(75) Inventors: Karlheinz Bartzke, Gotha (DE); Stefan Mack, Freiburg (DE); Matthias Burkhardt, Eichenberg (DE); Thomas Hartmann, Jena (DE); Reinhard Steiner, Stadtroda (DE); Peter Dittrich, Jena (DE); Karl-Heinz Klopfleisch, Jena (DE)

(73) Assignee: Carl Zeiss Jena GmbH, Jena (DE)

( * ) Notice: Subject to any disclaimer, the term of this patent is extended or adjusted under 35 U.S.C. 154(b) by 296 days.

(21) Appl. No.: 09/980,722

(22) PCT Filed: Mar. 15, 2001

(86) PCT No.: PCT/EP01/02921

§ 371 (c)(1),
(2), (4) Date: Feb. 13, 2002

(87) PCT Pub. No.: WO01/69297

PCT Pub. Date: Sep. 20, 2001

(65) Prior Publication Data

US 2003/0006675 A1 Jan. 9, 2003

(30) Foreign Application Priority Data

Mar. 16, 2000 (DE) .......................................... 100 12 751

(51) Int. Cl.[7] .............................................. H01L 41/08
(52) U.S. Cl. ................................................. 310/323.01
(58) Field of Search ........................... 310/328, 323.01, 310/323.17; 323/328; 396/133; 359/824; H01L 41/08

(56) References Cited

U.S. PATENT DOCUMENTS

| 4,894,579 A | * | 1/1990 | Higuchi et al. ............. 310/328 |
| 5,225,941 A | | 7/1993 | Saito et al. |
| 5,237,238 A | | 8/1993 | Berghaus et al. |
| 5,281,875 A | | 1/1994 | Kiesewetter et al. |
| 5,751,090 A | * | 5/1998 | Henderson .................. 310/328 |
| 6,067,421 A | * | 5/2000 | Kitazawa et al. ........... 396/133 |
| 6,211,602 B1 | * | 4/2001 | Yoshida et al. ........ 310/323.01 |

FOREIGN PATENT DOCUMENTS

| DE | 36 10 540 | 11/1988 |
| DE | 691 25 974 T2 | 1/1992 |
| DE | 40 23 311 | 8/1993 |
| DE | 691 25 974 | 11/1997 |
| EP | 0 675 589 | 10/1995 |

OTHER PUBLICATIONS

Journal of Scientific Instruments (Journal of Physics E) 1969 Series 2 vol. 2, revised form Jun. 12, 1969, pp. 661–663, Article: Micro–step motor by G.C. Joyce, et al.

Electronics And Communications in Japan, Part 3, vol. 81, No. 11, 1998, pp. 11–17; Article: Development of Linear Actuators Using Piezoelectric Elements, by Okamoto, et.

(Continued)

*Primary Examiner*—Thomas M. Dougherty
*Assistant Examiner*—Karen Addiso
(74) *Attorney, Agent, or Firm*—Reed Smith LLP

(57) ABSTRACT

In an adjusting device for displacing individual elements (2) of optical systems or of measuring systems in which the element to be displaced is movable on a base (1) along a predetermined direction (x) by means of a piezoelectric actuator arrangement (21, 22) which is supported by the element (2) and which is constructed and controllable in such a way that it exerts shock pulses on the element (2) in order to carry out a stepwise movement of the element (2) on the base (1), the element (2) is arranged in a body (1; 27) which has an open or closed hollow cross section and is supported in a frictional engagement on this body, at least at one location, with the intermediary of a pretensioned spring device (8, 8').

22 Claims, 4 Drawing Sheets

OTHER PUBLICATIONS

1988 American Institute of Physics, Feb. 1988, pp. 368–369, Article: Simple piezoelectric translation device, by Niedermann, et al.

Patent Abstract of Japan, Pub. No. 11–146668 Nov. 5, 1999 of Appln No. 9–307376 Nov. 10, 1997 (US Equivalent USP 6,153,963).

* cited by examiner

ADJUSTING DEVICE FOR DISPLACING INDIVIDUAL ELEMENTS OF OPTICAL SYSTEMS OR OF MEASURING SYSTEMS

The invention is directed to an adjusting device for displacing individual elements of optical systems or of measuring systems, wherein the element to be displaced is movable on a base along a predetermined direction by means of a piezoelectric actuator arrangement.

Adjusting devices serving to displace individual elements of optical systems or of measuring systems on a base along a predetermined direction are used in different fields such as in optical instruments (for displacing lenses or diaphragms in the millimeter range or in an even smaller adjustment range) or in precision measurement instruments for positioning of objects with nanometer precision.

For this purpose, a plurality of drive arrangements are known in which driving is carried out by pneumatic, hydraulic or electromechanical means. However, devices which operate with a piezoelectric drive have proven especially suitable.

DE 36 10 540 C, for example, discloses a micromanipulator for micromovement of objects which, in order to generate the micromovement, uses hollow cylinders which comprise piezoelectric material and bend when supplied with voltage and, in this way, cause a stepwise displacement of the object supported on the hollow cylinder. However, these object movements are not reproducible and can therefore not be used for certain applications, e.g., in microscopy. In addition, only relatively small adjusting paths are achieved with this known arrangement.

DE 40 23 311 A describes an adjusting device for micromovements in which the drive is achieved by means of a piezo transducer utilizing the shear effect, wherein the drive elements comprising this piezo transducer not only cause movement of the objects resting against them, but also guide them in the movement direction. In so doing, the object is pressed against the (piezo) drive element with a predetermined force by means of a contact pressing device. Drive can be effected in such a way that the piezo transducer gradually carries out the shear movement and carries along with it the object supported thereon, while the restoring or return movement of the piezo transducer is carried out quickly by overcoming the friction between this piezo transducer and the object. However, in the same way, the piezo transducer can also be controlled in the opposite manner; namely, a rapid shear movement is initially carried out (while overcoming the friction) in which the object does not move due to its inertia; whereupon a slow return movement is carried out in which the object is carried along in this returning direction. In this way, it is possible with this known driving means to move the object not only in one direction but also in the opposite direction. In this connection, the piezo drive elements have supports at their upper sides which are provided with spherical seats for balls, the moveable object being supported on the balls. It is disadvantageous that abrasion occurs due to the sliding friction at the ball elements, so that functionality is impaired over a long period of use. Also, the attainable adjusting speed of the object is relatively slow.

Finally, DE 691 25 974 T2 and U.S. Pat. No. 5,225,941 A disclose a drive device for an object which is guided on a rod in a sliding manner, this rod being excited in turn by a piezo actuator to expand and contract in longitudinal direction. In this connection, a slow expansion and a fast contraction of the rod can also be achieved by suitable control of the piezo actuator so that the object is carried along due to frictional forces during the slow expansion, while, as a result of its inertia, the object remains in place during the fast contraction while overcoming the friction forces. Accordingly, it is possible for the object to move forward stepwise in longitudinal direction, wherein driving can also be carried out in the opposite direction when the piezo element is controlled in the opposite direction (for fast expansion and slow contraction). However, expenditure for construction is comparatively high in this known construction and a plurality of individual arrangement elements must be provided. In addition, the adjustment range between the two bearings of the displacing rod is also relatively limited with respect to larger adjustment paths.

On this basis, it is the object of the invention to propose an improved adjusting device for displacing individual elements for optical systems or for measuring systems which enables a particularly fast adjustment along a large adjusting path with continuous maximum precision and which can be produced economically and constructed in a simple manner.

According to the invention, this object is met by an adjusting device for displacing individual elements of optical systems or of measuring systems, wherein the element to be displaced is movable on a base along a predetermined direction by means of a piezoelectric actuator arrangement which is supported by the element and which is constructed and controllable in such a way that it exerts shock pulses on the element in order to carry out a stepwise movement of the element on the base, wherein the element is arranged in a body which has an open or closed hollow cross section and is supported in a frictional engagement on this body, at least at one location, with the intermediary of a pretensioned spring device. The body preferably has a U-shaped cross section or a circular hollow cross section.

In the adjusting device according to the invention, the piezoelectric actuator arrangement is supported by the displaced element itself and is constructed and controllable in such a way that shock pulses are exerted on the element itself by the piezoelectric deflections. By means of the impact forces acting on the element due to the shock pulses, this element can be moved forward stepwise in a direction corresponding to the direction of the shock pulses when the friction between the element and its base is exceeded. However, due to the fact that the piezoelectric actuator is supported by the element itself, this means that the element carries all of the devices of its piezoelectric drive itself and, therefore, in principle, has an adjusting range that is as large as desired. In this case, the element can be moved in the relevant direction in principle for as long as the piezoelectric actuator continues sending its shock pulses, so that a very large adjusting path can easily be realized when using the adjusting device according to the invention.

Because of the frictionally engaging support of the body on at least one point on its base with the intermediary of a pretensioned spring device, a frictional force is initially generated which serves in the switched off state of the actuator arrangement to fix the moved element in position and ensures that once a position has been reached it will not change again in an unwanted manner. Accordingly, it is also possible with the adjusting arrangement according to the invention to carry out adjusting movements in the direction of or at an inclination to gravitational force in order, for example, to adjust an element upward from a lower position (or vice versa) in a vertically extending pipe. By means of the spring, it can easily be ensured that when the element reaches a determined adjusting position it will also remain in this adjusting position even with continuously acting gravitational force, wherein adjusting steps of identical magnitude can be achieved in the ascending direction as well as in the descending direction. The only prerequisite in this respect is that the occurring friction force is greater than the maximum load on the actuator in every case.

In a preferred construction of the adjusting device according to the invention, the element to be displaced has a plate whose shape is substantially adapted to the inner cross section of the body and in which the pretensioned spring device comprises a strip extending at least partially along the outer circumference of the plate and has spring tongues which project laterally, preferably over the front side and rear side of the plate, and are arranged at a distance from one another, these spring tongues extending diagonally from the strip in the direction of the associated inner wall of the body and resting against the latter under spring pressure. In this connection, it is particularly preferred that another, second plate whose shape likewise corresponds substantially to the inner shape of the hollow cross section of the body is provided parallel to the displacing element, but is not provided with a spring device and is connected with the element to be displaced by a tubular piezo actuator.

Alternatively, instead of the tubular piezo actuator, it can also be provided that a piezoelectric plate actuator extending parallel to the respective side surface of the body can be fastened by one end between the two plates in the vicinity of the two sides on which the spring tongues are arranged at the one plate, wherein the other ends of the two piezoelectric plate actuators are fastened in turn to the second plate arranged parallel to the element to be displaced.

These solutions have the advantage of particularly small overall structural dimensions which allows them to be applied in particular for zoom objectives in stereo microscopes. In addition, the structural solution is quite simple. The inertia body (namely, the element to be displaced) is connected with the second plate only by the piezo actuator (piezo tube or the two piezo plates) and serves at the same time to guide the actuator.

The element in the form of a plate and/or the second plate preferably have/has a receptacle for holding, e.g., a lens, and accordingly also serves as the lens mount, so that the position of the lens can be displaced in a corresponding manner by means of the displacement of the element.

A particularly preferred construction of the invention consists in that a measuring head for scanning a measurement strip, a bar code, or the like, is arranged at the element to be displaced, preferably at its terminating surface in the front or back in relation to the movement direction, which again provides a very simple construction solution which can also be produced economically.

Another preferred construction of the adjusting device according to the invention consists in that the body is formed of a plate, wherein a plate-shaped piezo actuator which is arranged substantially at right angles to the respective plate surface is fastened to the two plate surfaces of the plate, and this piezo actuator can be deflected in the desired movement direction of the plate when its end projecting from the plate is acted upon. In this connection, a mass body is preferably fastened to the free ends of the two plate actuators (each of which projects on one side of the body), wherein, again preferably, the two plate actuators and the mass bodies arranged at their free ends are arranged symmetric to the longitudinal center plane of the plate. The two piezo actuators can preferably also be formed by a plate actuator which is guided through the plate and projects on both sides.

These embodiments of the adjusting device according to the invention provide a particularly simple, very economical construction which can also easily be manufactured on a large scale but with which very precise and reproducible adjusting movements can nevertheless be carried out without difficulty.

In another especially advantageous construction of the adjusting device according to the invention, the element to be displaced is constructed so as to be substantially tubular (e.g., it can be formed by a lens arrangement), is arranged concentrically in the likewise essentially tubular body and is fastened at one axial end to a radially enlarged guide disk which is supported radially on the inner surface of the tubular body with the intermediary of at least one spring element, wherein the piezoelectric actuator is constructed in this instance as a disk-shaped piezo actuator which is supported in turn, likewise with the intermediary of at least one spring element, radially on the inner surface of the tubular body. In a particularly preferred manner, the disk-shaped piezo actuator is connected on one axial side to the element to be displaced by an elastic, tubular coupling member, wherein it also preferably carries a mass on its side located axially opposite from the element to be moved, which mass is arranged concentric to this element.

This embodiment form of the invention provides an excellent, very economical and highly precise adjustment possibility, e.g., for lens systems, which is advantageous for its simple construction and excellent efficiency.

In the following, the invention, in principle, will be described more fully by way of example with reference to the drawing.

Figure 1:
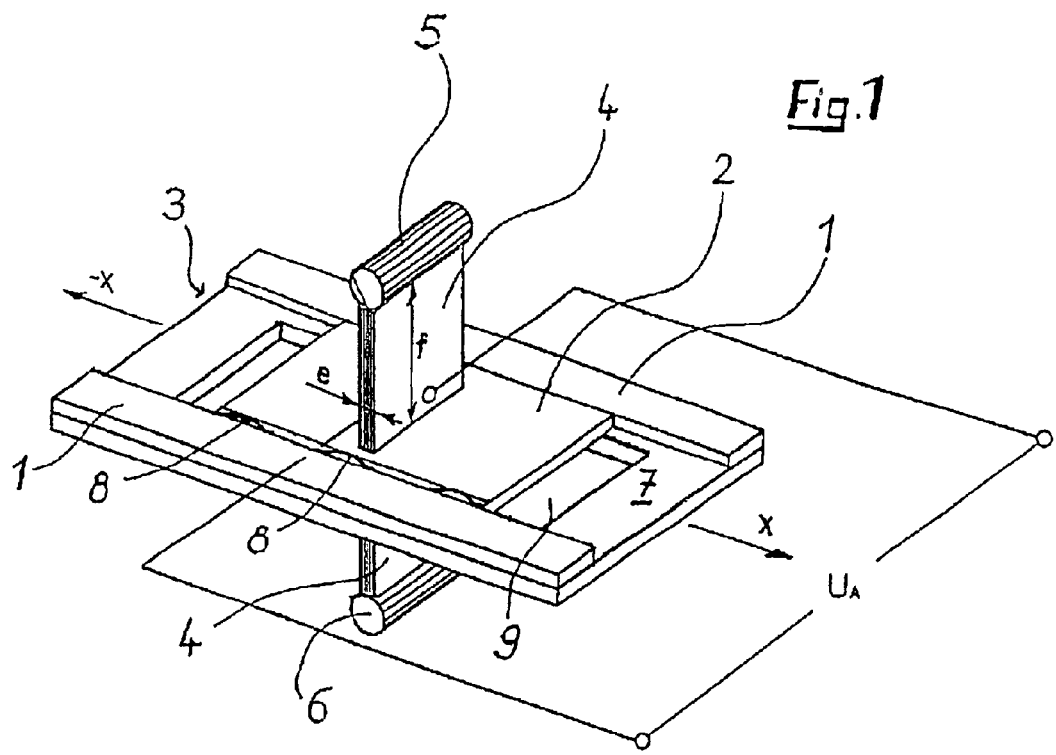
FIG. 1 shows a perspective schematic view of a first embodiment form of an adjusting device according to the invention.

An adjusting device according to the invention is shown schematically in an oblique perspective view in FIG. 1. An element 2 to be adjusted or moved is formed as a plate 2 and located on the base 1.

The base 1 is constructed as a plane base forming a recess 3 within which the plate-shaped element 2 is located. The width of the recess 3 is selected in such a way that the lateral boundary walls of the recess 3 serve as lateral guide walls for the plate-shaped element 2 (with the intermediary of lateral support springs, see below) which is accordingly enclosed on its underside as well as on its two side surfaces by the base 1 in the form of a hollow cross section opening upward. By hollow cross section is meant a cross section ensuring a support of the plate-shaped element 2 on at least three sides of the same.

The plate-shaped element 2 should be moved in longitudinal direction of the recess 3, namely, in direction x or in the opposite direction −x indicated by the arrow.

For this purpose, a plate-shaped piezo bending actuator 4 is provided approximately in the center of the plate-shaped element 2 (seen in its extension in movement direction x), passes through the plate-shaped element 2 and protrudes on both sides thereof by the same distanced f. mass 5 and 6 is arranged respectively on both protruding ends. The mass 5 and 6 is shown only schematically in FIG. 1 in the form of a cylindrical body extending along the length of the respective end.

This piezoelectric bending plate actuator (piezo element) 4 is shown as a piezoelectric bender or bimorph, as it is called, and has a thickness e. In the same way, however, the piezo element 6 could also be constructed as a unimorph or multimorph, wherein the latter comprises a plurality of right-polarized and left-polarized piezo foils which are arranged alternately side by side and form a left and right foil stack between which is arranged an insulating foil.

As is shown only schematically in FIG. 1, a voltage $U_A$ is applied to the piezo element 4, this voltage $U_A$ being varied in a suitable manner in order to constantly deflect the piezo actuator 4 on both sides of the plate-shaped element 2 in the desired adjusting direction (and return it to the initial position again). In so doing, shock pulses constantly act on the plate-shaped element 2 and, as a result of the impact forces exerted on the latter, cause a stepwise movement of the plated-shaped element 2 to be carried out by overcoming the friction between the plated-shaped element 2 and the floor 7 and side walls of the recess 3. By suitable selection of the voltage, a movement can be achieved in direction x as well as in the opposite direction −x. However, the adjustment step of the element 2 is only a fraction of the excursion distance of the piezo actuator 4.

The piezo actuator is operated in resonance with short frequencies in the range of 5 to 50 kHz depending on type, wherein the control voltages are 6 to 40 V. The step size of known piezo actuators is 0.2 $\mu$m and their adjusting speed is about 100 mm/s. Known piezo actuators which can be used in this case can move masses of up to a maximum of 100 g (also vertically).

As is shown in FIG. 1, the plate-shaped element 2 is provided at its two longitudinal sides with laterally projecting spring elements 8 by which it is supported on both sides against the side walls of the recess 3 with predetermined pretensioning. Spring tongues made of spring steel which are relatively stiff considered in the movement direction but which have good elastic deformability at right angles to the movement direction are preferred for this purpose. The pretensioning of the spring tongues 8 in the installed state is selected in such a way that the friction force occurring between them and the side walls of the recess 3 and the friction force occurring at the floor of the recess 3 with the plate-shaped element is greater as a whole than the load of the plate-shaped element 2 with the piezo actuator 4 fastened to it and its weights 5, 6; specifically, it is so much greater that the friction which occurs during a movement of the element 2, which is smaller, also still always exceeds the above-mentioned load of the element 2 with parts arranged thereon. In this way, it is ensured that the element 2 will occupy a secure semi-position in case of outage of the drive even with vertical movement. Accordingly, it is also possible to drive the plate-shaped element 2, e.g., in a vertical or almost vertical direction (although the base 1 must be correspondingly constructed in this case), which ensures that the plate-shaped element 2 can not fall out of the open side of the recess 3. Thus, due to the spring tongues, also when the element 2 moves vertically for example, the element 2 remains at the location that has been reached when the drive is turned off even under the influence of gravitational force.

The piezo actuator 4 can be controlled in different ways: The electrical control of the piezo actuator 4 can be carried out in any suitable manner such as, e.g., with sawtooth pulses (see FIG. 5) or also, e.g., by means of suitable rectangular pulses.

Figure 5:
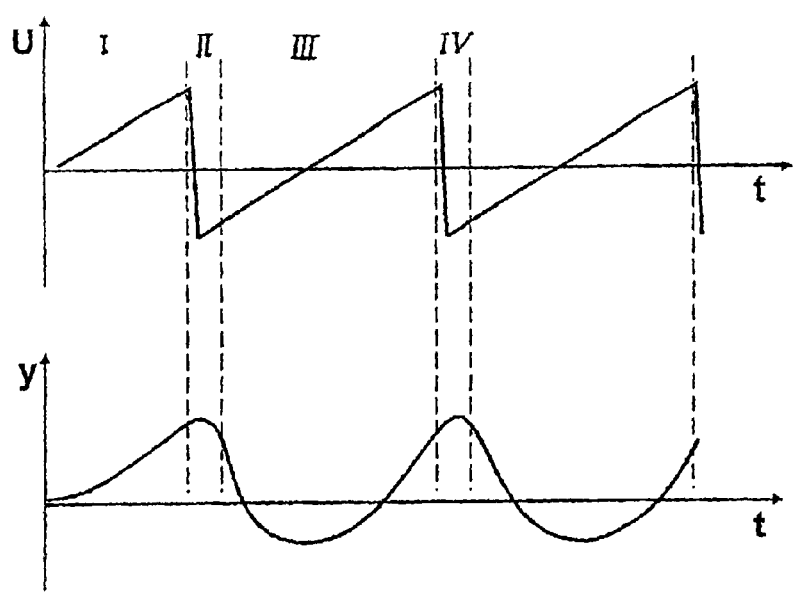
FIG. 5 shows a graph of the voltage curve of the excitation voltage for the piezo drive of an adjusting device according to the invention with sawtooth voltage change and a graph of the associated deflection of the piezo element, over time in each instance.

When controlled with sawtooth pulses, as is shown in FIG. 5, the steep side causes the adjusting step due to a high acceleration of the piezo element 4 (which must be suitable for overcoming the adhesion friction), while no adjusting step occurs with the flat side due to the low acceleration (which can not overcome the adhesion friction).

The deflection of the piezo element y is plotted over time t in FIG. 5 which also shows the curve of the voltage U over time t.

In the initial area I, the relatively flat side of the sawtooth voltage brings about a moderate acceleration of the center of gravity of the inert mass in the system which was initially at rest; generally, the acceleration force remains less than the friction force so that no movement occurs.

A steep side of the sawtooth voltage in the opposite direction follows in area II. Due to the sudden strong reversal of polarity of the electric voltage in connection with the deflection of the piezo element 4 achieved up to this point with the inert masses 5, 6 arranged at this piezo element 4, this steep side leads to a large shock-like force acting on the element 2 to be moved. The large acceleration of the inert mass is clearly shown by the sharp curvature of the path characteristic y(t). After this point in time, the sliding movement then generally begins in the friction surface, wherein the friction work performed draws mechanical energy from the oscillatory system.

In the following phase III, the oscillation amplitude decreases again appreciably and the inert mass is again gradually delayed and accelerated back over the course of the following flat sawtooth side.

Finally, in phase IV, after the next positive sawtooth peak is reached, a new cycle is begun insofar as the pulse train continues.

FIG. 1 further shows that an opening 9 is formed on the floor 7 of the recess 3, the width of this opening 9 being somewhat greater than the width of the piezo actuator 4. In this way, the piezo actuator can protrude on both sides of the element 2 to be moved without impairing the movability of the element 2.

Figure 2:
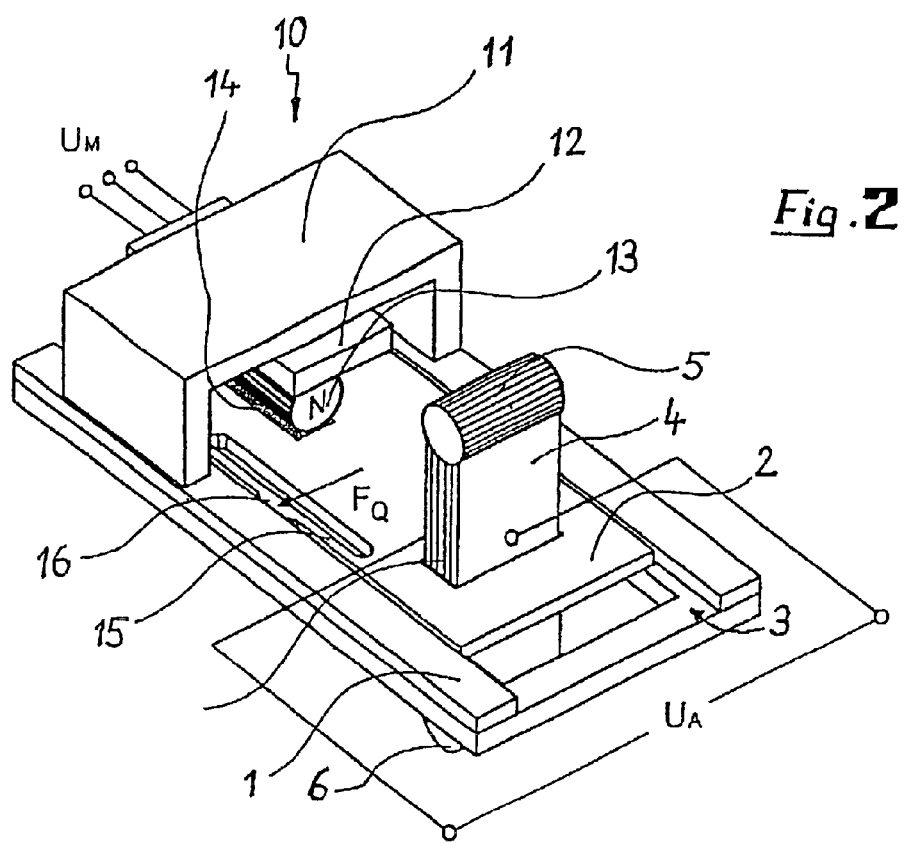
FIG. 2 shows another embodiment form of an adjusting device according to the invention similar to that in FIG. 1 but coupled with a path measurement system.

FIG. 2 shows schematically an almost identical arrangement to the one shown in FIG. 1, wherein, however, the plate-shaped element 2 to be moved is coupled with a path measurement system 10.

However, in contrast to the embodiment form shown in FIG. 1, the piezoelectric actuator 4 in the embodiment form according to FIG. 2 is no longer arranged in the center of the plate-shaped element 2 (with reference to the longitudinal extension of the element 2), but rather in its front area with respect to movement direction x, namely, in such a way that (as is shown in FIG. 2) the piezo actuator 4 is located approximately in the center of the longitudinal extension of the element 2 lying outside of the bridge 11.

Another change from the construction according to FIG. 1 consists in that a pretensioned springing contact pressing device is arranged against the side wall of the recess 3 on only one side of the plate-shaped element 2 in the arrangement according to FIG. 1 rather than on both sides. As can be seen from FIG. 2, this is a spring pin 15 which is formed at the side of the plate-shaped element 2 and which is provided with a thickened projection 16 on its side located toward the facing side wall of the recess 3, which thickened projection 16 rests against this side wall in a springing manner. The spring pin 15 is formed as a thin side wall of an opening in the element 2, as is shown in FIG. 2.

In addition to the embodiment form which has already been described with reference to FIG. 1, a bridge 11 with a Hall probe 12 is arranged on the base 1. In addition, a permanent magnet 13 is fastened by a suitable connection 14 to the upper side of the element 2 to be moved. The relative movement between the element 2 and the base 1 can be measured with this measuring arrangement.

However, all other conventional and known measuring systems in optical precision instrument construction, e.g., numeric measuring systems or the like, can also be used to measure this relative movement between the element 2 and the base 1. For the sake of simplicity, the electrical connection between the output $U_M$ and the measuring arrangement and evaluating electronics is not shown in FIG. 2.

The contact pressing force $F_Q$ acting between the projection 16 and the side wall of the recess 3 comes about due to the elastic bending of the spring pin 15. In this way, friction forces whose magnitude can be fixed in a defined manner can be generated (naturally, these friction forces are in addition to the friction forces on the other side of the plate-shaped element 2 with the side surface of the base 1 located at the latter and on its underside with the floor of the recess 3, at least in the side areas in which a support takes place).

Of course, a plurality of springing contact pressure locations of the kind mentioned above can be provided along the length of the element 2 on one side thereof or on both sides, as can other suitable springing contact pressing devices which permit an adjustment of the total friction forces to be overcome by the piezo actuator 4.

Figure 3:
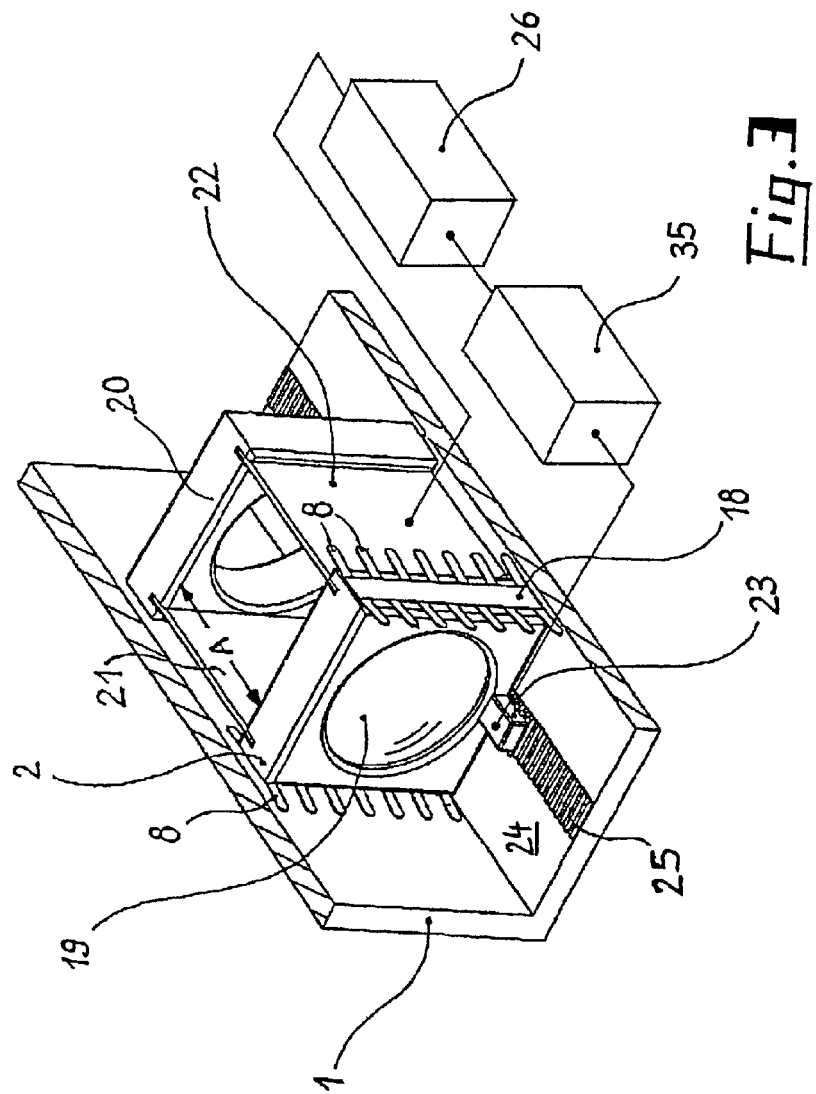
FIG. 3 shows (partially in section) an embodiment form of another adjusting device according to the invention in connection with a path measuring system.

FIG. 3 shows a perspective schematic view, partially in section, of another embodiment form of an adjusting device according to the invention which is distinguished by a small and compact size, economic manufacture and particularly smooth running.

In this connection, the base 1 is constructed in the form of a hollow section (guide pipe) which is rectangular in cross section and which is also open on one side (e.g., toward the top in the view shown in FIG. 3) and which can be made, e.g., from a fiber-reinforced plastic.

As is shown in FIG. 3, the element 2 to be displaced is constructed in the form of a plate which is essentially adapted to the inner cross section of the body or base 1.

The pretensioned spring device by which the element 2 to be moved is supported on the base 1 is constructed in the form of spring tongues 8 and 8' which are arranged at two opposite sides at the outer circumference of the plated-shaped element 2 and which project on both sides from a center strip 18 extending vertically along this side and are inclined at a slight angle relative to the facing side surface of the base 1 and are supported at their free ends in this location.

The element 2 to be moved has a round opening, e.g., for holding a lens 19, having a diameter of 15 mm, for example.

A second plate-shaped element 20 (made of brass) which is shaped in the same manner is arranged so as to be offset axially relative to the element 2 by a distance A and has no spring tongues on the sides at which the lateral spring tongues 8 are located in the plate-shaped element 2. Rather, these sides of the element 20 are not in contact with the facing side wall of the base 1, but rather form a small gap relative to the latter.

As is shown in detail in FIG. 3, the plate-shaped elements 2 and 20 are connected with one another at their end areas adjacent to the two facing side surfaces of the base 1 by means of two piezoelectric plate actuators 21 and 22, wherein the piezo actuators 21 and 22 extend parallel to the respective side walls of the base 1 and are suitably fastened by their end faces to the elements 2 and 20, respectively.

A measuring head 23 (e.g., a measurement light barrier) which can scan a code 25 (in the form of a bar code or measurement strip, for example) arranged on the facing base surface 24 of the base 1 with reference to the movement direction of the arrangement is arranged at the surface of the plate-shaped element 2 located in front with respect to the movement direction.

As is shown only schematically in FIG. 3, the electrical pulses for the piezo plates 21, 22 are supplied by regulating electronics 26 which are connected in turn to measurement electronics 35 which are connected to the measuring head 23 and which trigger the sinusoidal path measurement signal supplied by the measuring head. This arrangement, which is only shown schematically, makes it possible to accurately approach, e.g., a reference position for the element 2 to be adjusted which can be predetermined by a device, not shown.

Figure 4:
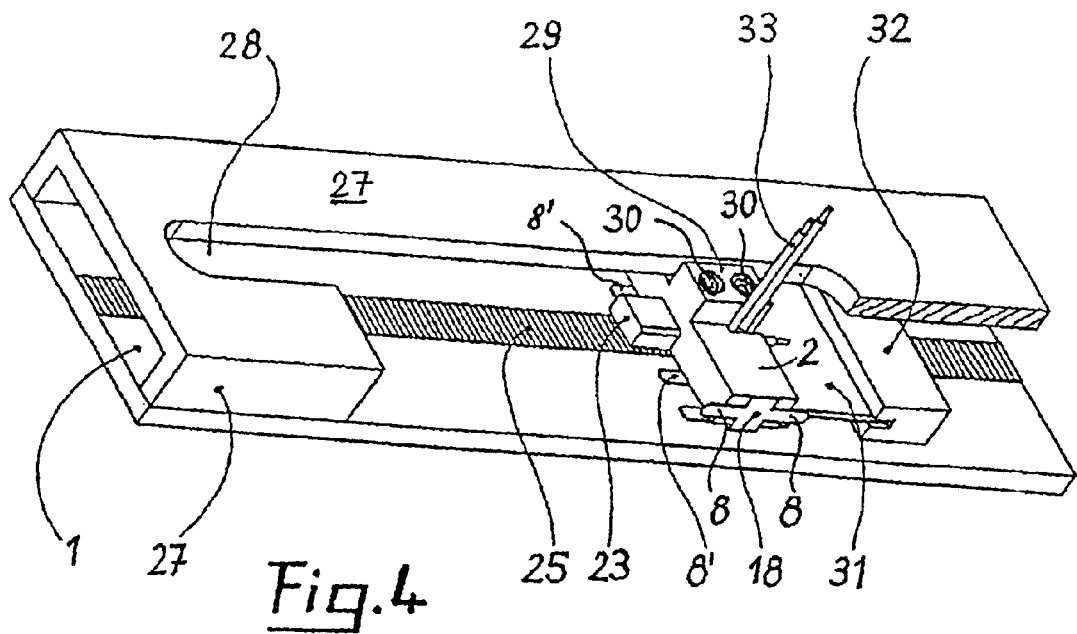
FIG. 4 shows (partially in section) a perspective view of another embodiment form of an adjusting device according to the invention with a path measuring system.

Finally, FIG. 4 shows another embodiment example for an adjusting device according to the invention in the form of a piezoelectric linear drive module which is coupled with a path measuring system. The drawing shows an oblique perspective view (with a partial sectional view).

In this case, the base 1 is plate-shaped and carries, approximately in its center, a code 25 in the form of a grid scale (e.g., with a grid spacing of 20 µm).

A cover 27 which is U-shaped in cross section is arranged on the base 1. On its side opposite the base 1, the cover 27 is provided with a longitudinal slot 28 oriented to the code strip 25.

An element 2 to be moved is provided inside the hollow cross section formed by the base 1 and cover 27. This element 2 is movable in longitudinal direction of the overall arrangement, that is, in longitudinal direction of the slot 28, by a piezoelectric drive which will be described more fully in the following. A measuring or reading head 23 for scanning the code 25 is provided at the side of the element 2 located in front with respect to the movement direction. A reflected light barrier or an optoelectronic transmitter and receiver can be used, for example, as a measuring head of this kind.

The element 2 is so constructed in cross section that it essentially fills the free interior space between the cover 27 and the base 1 in cross section and is provided at its upper side with a blocking projection 29 which projects into the longitudinal slot 28 and preferably runs up to the outer surface of the corresponding side of the cover 27. An internal thread 30, for example, for screwing on a part to be moved is arranged in this blocking projection 29 outside of the overall arrangement shown in the drawing.

As can be seen from the view in FIG. 4, the element 2 forming the displacing body has spring elements 8 and 8', respectively, on its side facing the observer as well as on its side facing the base 1. These spring elements 8 and 8' are constructed as spring tongues which proceed from a center strip 18 and extend in the movement direction and opposite the movement direction and project in each instance over the corresponding front side and back side of the displacing body 2. These spring tongues 8 and 8' are inclined at a small angle to the facing contact surface (that is, toward the respective lateral side of the cover 27 or base 1), where they make springing contact with their end areas. An excellent displacing support of the displacing body 2 which is free of play is achieved by this arrangement of the spring elements 8 and 8'.

The driving of the displacing body 2 is carried out by means of a plate-shaped piezo actuator 31 which is fastened to the displacing body 2 on the side of the latter located opposite the measuring head 25, extends parallel to the base 1 and has a block-shaped mass body or inertia body 32 at its free end; however, this mass body or inertia body 32 has no independent springing support relative to the base 1 and side walls of the cover 27 (as can also be seen from FIG. 4), but rather is fastened freely to the end of the piezoelectric actuator 31. A piezoelectric plate with top and bottom electrodes and, for example, with a length of 8 mm, a width of 16 mm and a thickness of 0.5 mm is preferably used as a piezo actuator 31.

The electric piezo actuator 31 and the measuring head 23 can be controlled via electric connections 33 which, as is shown in FIG. 4, exit on the top of the displacing body 2, namely, in a gap formed between one side of the block projection 29 and the facing side of the longitudinal slot 28.

The spring tongues 8 and 8' provide for the desired friction force (which is particularly important with respect to a vertical movement) and for guiding the displacing body without play within the follow space formed by the cover 27 and base 1.

The piezoelectric linear drive modules which are shown in FIG. 3 or FIG. 4 are very well-suited for use in incremental path measuring systems, wherein the very inexpensive manufacture and simple design solution are also particularly remarkable for the low cost of the piezo plate. Both embodiment forms operate extensively without noise, which is likewise a great advantage.

Figure 6:
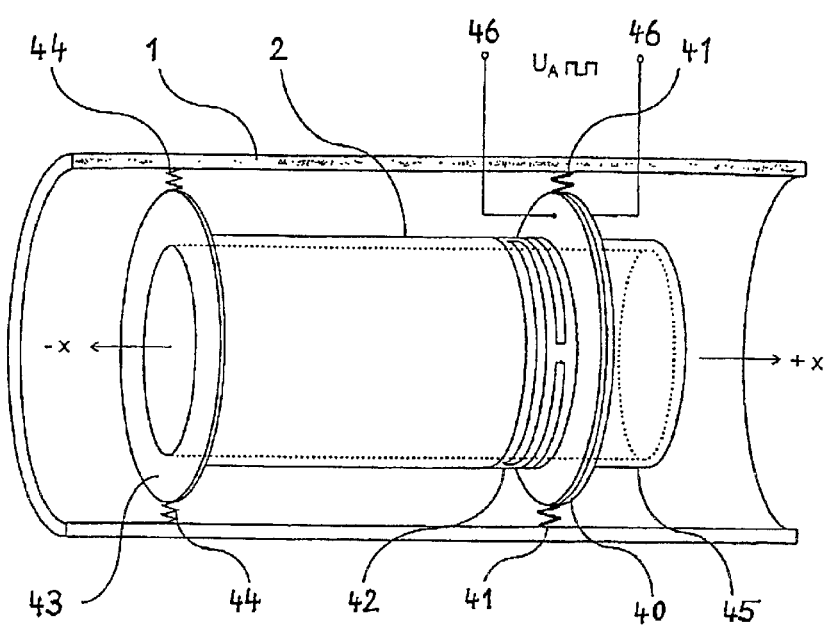
FIG. 6 shows another embodiment form of an adjusting device according to the invention with disk-shaped piezo actuators.

FIG. 6 shows a schematic view of another adjusting device in which the body 1 forming the friction base is constructed as a sleeve-shaped tube. The view in FIG. 6 is executed in such a way that the sleeve-shaped body 1 is cut along a diameter but the adjusting device located therein is not shown in section, the whole being shown in perspective.

In this case, a disk-shaped piezo element 40 which is supported on the inner surface of the sleeve-shaped body 1 by spring elements 41 (shown only schematically in FIG. 6) is provided as piezoelectric actuator.

The element 2 to be moved which can be formed in the present embodiment example, e.g., by a lens group (not shown) and which is constructed in a tubular manner and is arranged concentrically within the sleeve-shaped body 1 is centrally connected with the disk-shaped piezo element 40 by an elastic coupling member 42, wherein an added mass 45 (which, as is shown in the present embodiment example, can also comprise an end portion of the tubular body 2 which is guided through the disk-shaped piezo actuator 40 and projects over its opposite side) is arranged at the piezo element 40 on the opposite axial side.

A guide disk 43 which is supported on the radial outside opposite to the inner side of the sleeve-shaped body 1 by one or more spring elements 44 serves to guide and reinforce the body 2 and the lens group which forms the latter.

The disk-shaped piezo actuator 40 used in this case causes a translational movement of the system comprising itself, the mass 45, the elastic coupling member 42, the connected lens group 2 and the guide disk 43 and spring elements 41 and 44.

The size of the mass 45 connected to the disk-shaped piezo actuator 40 corresponds to about 50% of the mass of the disk-shaped piezo actuator 40 and elastic head element 42.

As is shown only schematically in FIG. 6, the disk-shaped piezo actuator 40 is controlled via electric connections 46 across which a voltage $U_A$ is applied, resulting in an accelerated bending of the disk-shaped piezo actuator 40 in the form of defined positive or negative voltage pulses. In this case, for example, a bending of the piezo actuator 40 takes place in −x direction which, due to the inertia of the disk-shaped piezo actuator 40 in connection with the mass 45 and the action of the spring elements 41, causes a movement of the system in +x direction. A movement of the lens group 2 in the opposite direction is generated in an analogous manner when the polarity of the voltage is reversed.

What is claimed is:

1. An adjusting device for displacing individual elements of optical systems or of measuring systems, comprising:
    a body;
    a piezoelectric actuator arrangement which is supported by an element to be displaced for moving the element on said body along a predetermined direction, said piezoelectric actuator arrangement moving with the element to be displaced;
    said piezoelectric actuator arrangement being constructed and controllable in such a way that it exerts shock pulses on the element in order to carry out a stepwise movement of the element on the body; and
    said body having an open or closed hollow cross section and said element to be displaced being supported in a frictional engagement on said body, at least at one location, with an intermediary of a pretensioned spring device, said element being arranged in said body.

2. The adjusting device according to claim 1, wherein the body has a U-shaped cross section or a circular hollow cross section.

3. The adjusting device according to claim 1, wherein the element has a plate whose shape is substantially adapted to the inner cross section of the body and the pretensioned spring device comprises a strip extending at least partially along the outer circumference of the plate and has spring tongues which project laterally, over the front side and rear side of the plate, and are arranged at a distance from one another, said spring tongues extending diagonally from the strip in the direction of the associated inner wall of the body and resting against the latter under spring pressure.

4. The adjusting device according to claim 3, wherein another, second plate whose shape likewise corresponds substantially to the inner shape of the hollow cross section of the body is provided parallel to the displacing element, but is not provided with a spring device and is connected with the element to be displaced by a tubular piezo actuator.

5. The adjusting device according to claim 3, wherein a piezoelectric plate actuator extending parallel to the respective side surface of the body is fastened by one end in the vicinity of the two sides on which the spring tongues are arranged, wherein the two free ends of the two piezoelectric plate actuators are fastened in turn to a second plate arranged parallel to the element to be displaced, wherein the shape of the second plate corresponds substantially to the inner shape of the hollow cross section of the body which, however, is not provided with a spring device.

6. The adjusting device according to claim 4, wherein the element in the form of a plate and/or the second plate have a receptacle for holding a lens.

7. The adjusting device according to claim 1, wherein a measuring head for scanning a measurement strip, a bar code, or the like, is arranged at the element to be displaced, at a terminating surface in the front or back in relation to the given direction.

8. The adjusting device according to claim 1, wherein the body is formed of a plate, wherein a plate-shaped piezo actuator which is arranged substantially at right angles to the respective plate surface is fastened to the two plate surfaces of the plate, and this piezo actuator can be deflected in the desired movement direction of the plate when its end projecting from the plate is acted upon.

9. The adjusting device according to claim 8, wherein a mass body is fastened to the free ends of the two plate actuators.

10. The adjusting device according to claim 9, wherein the two plate actuators and the mass bodies arranged at their free ends are arranged symmetric to the longitudinal center plane of the plate.

11. The adjusting device according to claim 7, wherein the two piezo actuators are formed by a plate actuator which is guided through the plate.

12. The adjusting device according to claim 1, wherein the element to be displaced is constructed so as to be substantially tubular, is arranged concentrically in the likewise tubular body and is fastened at one axial end to a radially enlarged guide disk which is supported on the inner surface of the tubular body with the intermediary of at least one spring element, and wherein the piezoelectric actuator is constructed as a disk-shaped piezo actuator which is supported in turn, with the intermediary of at least one spring element, on the inner surface of the tubular body.

13. The adjusting device according to claim 12, wherein the disk-shaped piezo actuator is connected on one axial side to the element to be displaced by an elastic, tubular coupling member.

14. The adjusting device according to claim 13, wherein the disk-shaped piezo actuator carries a mass on its side located opposite from the element to be displaced, which mass is arranged concentric to this element.

15. An adjusting device for displacing individual elements of optical systems or of measuring systems, comprising:
a body;
a piezoelectric element supported by an element to be displaced for moving the element on the body along a predetermined direction;
the piezoelectric element adapted to produce shock pulses on the element to carry out a stepwise movement of the element on the body;
the element to be displaced being supported in a frictional engagement on the body with a pretensioned spring device; and
a measuring head operable to scan measurement markers and arranged at the element to be displaced at a terminating surface in the front or back in relation to the given direction.

16. The adjusting device according to claim 15, wherein the body is formed of a plate, wherein a plate-shaped piezo actuator which is arranged substantially at right angles to the respective plate surface is fastened to the two plate surfaces of the plate, and this piezo actuator can be deflected in the desired movement direction of the plate when its end projecting from the plate is acted upon.

17. The adjusting device according to claim 16, wherein a mass body is fastened to the free ends of the two plate actuators.

18. The adjusting device according to claim 17, wherein the two plate actuators and the mass bodies arranged at their free ends are arranged symmetric to the longitudinal center plane of the plate.

19. The adjusting device according to claim 15, wherein the two piezo actuators are formed by a plate actuator which is guided through the plate.

20. The adjusting device according to claim 15, wherein the element to be displaced is constructed so as to be substantially tubular, is arranged concentrically in the likewise tubular body and is fastened at one axial end to a radially enlarged guide disk which is supported on the inner surface of the tubular body with the intermediary of at least one spring element, and wherein the piezoelectric actuator is constructed as a disk-shaped piezo actuator which is supported in turn, with the intermediary of at least one spring element, on the inner surface of the tubular body.

21. The adjusting device according to claim 20, wherein the disk-shaped piezo actuator is connected on one axial side to the element to be displaced by an elastic, tubular coupling member.

22. The adjusting device according to claim 21, wherein the disk-shaped piezo actuator carries a mass on its side located opposite from the element to be displaced, which mass is arranged concentric to this element.

* * * * *